United States Patent
Kim

(10) Patent No.: US 6,853,676 B2
(45) Date of Patent: Feb. 8, 2005

(54) APPARATUS AND METHOD FOR INSERTING AND DETECTING WATERMARK BASED ON STOCHASTIC MODEL

(75) Inventor: Hongseok Kim, Seoul (KR)

(73) Assignee: Korea Telecom, Sungnam-shi (KR)

( * ) Notice: Subject to any disclaimer, the term of this patent is extended or adjusted under 35 U.S.C. 154(b) by 974 days.

(21) Appl. No.: 09/735,922

(22) Filed: Dec. 14, 2000

(65) Prior Publication Data

US 2002/0138730 A1 Sep. 26, 2002

(30) Foreign Application Priority Data

Jun. 15, 2000 (KR) .......................................... 2000-32971

(51) Int. Cl.⁷ .............................. H04B 1/69; H04K 1/00
(52) U.S. Cl. ........................ 375/130; 382/100; 713/176
(58) Field of Search ......................... 382/100; 380/207, 380/54, 238; 713/176; 375/130, 150, 216, 240, 240.18, 340

(56) References Cited

U.S. PATENT DOCUMENTS

| | | | | |
|---|---|---|---|---|
| 5,319,735 A | * | 6/1994 | Preuss et al. ................ | 704/205 |
| 5,379,345 A | | 1/1995 | Greenberg .................... | 380/23 |
| 5,613,004 A | | 3/1997 | Cooperman et al. .......... | 380/28 |
| 5,687,191 A | | 11/1997 | Lee et al. .................... | 375/216 |
| 5,848,155 A | * | 12/1998 | Cox ............................ | 382/191 |
| 5,915,027 A | | 6/1999 | Cox et al. ..................... | 380/54 |
| 5,930,369 A | | 7/1999 | Cox et al. ..................... | 380/54 |
| 6,061,793 A | * | 5/2000 | Tewfik et al. ................ | 713/176 |
| 6,069,914 A | * | 5/2000 | Cox ............................. | 375/150 |
| 6,154,571 A | | 11/2000 | Cox et al. .................... | 382/250 |
| 6,208,735 B1 | * | 3/2001 | Cox et al. ..................... | 380/54 |
| 6,263,086 B1 | * | 7/2001 | Wang .......................... | 382/100 |
| 6,359,998 B1 | * | 3/2002 | Cooklev ....................... | 382/100 |
| 6,674,861 B1 | * | 1/2004 | Xu et al. ...................... | 380/252 |
| 6,707,927 B1 | * | 3/2004 | Kita et al. ................... | 382/100 |

OTHER PUBLICATIONS

J. H. McClellan and T. W. Parks, Eigenvalue and Eigenvector Decomposition of the Discrete Fourier Transform, IEEE Trans. on Audio and Electroacoustics, vol. AU–20, no. 1, Mar. 1972, pp. 66–74.*

M. D. Swanson, M. Kobayashi, and A. H. Tewfik, Multimedia Data–Embedding and Watermaking Technologies, Proc. of the IEEE, vol. 86, no. 6, Jun. 1998, pp. 1064–1087.*

I. J. Cox, J. Kilian, F. T. Leighton, and T. Shamoon, Secure Spread Spectrum Watermarking for Multimedia, IEEE Trans. on Image Processing, vol. 6, no. 12, Dec. 1997, pp. 1673–1687.*

Stochastic Model Based Audio Watermark and Whitening Filter for Improved Detection (The 2000 IEEE International Conference on Acoustics, Speech, and Signal Processing, Jun. 5, 2000).

* cited by examiner

Primary Examiner—Jayanti Patel
Assistant Examiner—Jamshid Goshtasbi-G.
(74) Attorney, Agent, or Firm—Staas & Halsey LLP

(57) ABSTRACT

A method for inserting and detecting a watermark based on a stochastic model is disclosed. The apparatus for inserting a watermark based on a stochastic model, includes: a generator for generating a spread spectrum signal by using a user key from outside; an estimator for estimating an autocorrelation matrix of an original signal from outside as an object for inserting a watermark; an eigenvalue decomposer for decomposing the autocorrelation matrix to an eigenvector matrix and an eigenvalue matrix; a watermark shaper for shaping a watermark from the spread spectrum signal in reference to both the eigenvector matrix and the eigenvalue matrix; and an adder for adding the watermark to the original signal.

20 Claims, 4 Drawing Sheets

APPARATUS AND METHOD FOR INSERTING AND DETECTING WATERMARK BASED ON STOCHASTIC MODEL

FIELD OF THE INVENTION

The present invention relates to an apparatus and a method for inserting and detecting a watermark based on a stochastic model, which inserts a new type of non-audible and error-tolerable watermark in an original signal and improves the quality of detection by reducing an interfering effect between an original signal and a watermark signal.

DESCRIPTION OF THE PRIOR ART

According to the development of digital technology, a variety of analog data have been being changed to digital-formatted data that can maintain a constant quality on a high level without degrading the quality of data, regardless of frequent plays and copies of data. Further, according to the development of the Internet, digital-formatted data have been being in more demand. Digital audio data that have been distributed in a compact disk (CD), recently, are distributed in the Internet by using the MP3 standard. However, due to a characteristic of digital data that is easy to copy and to play, distribution without any measure to prevent from copying the data would bring serious loss in a copyright owner's interest. In fact, the number of copyright infringements recently has been increased in seriousness, and various methods for protecting copyright thereupon have been developed.

As one of the methods, a watermarking technique has been proposed, which inserts an unrecognizable signal in original data and can be used in order to detect illegal use, change and counterfeit, and to protect copyright. One of the popular watermarking techniques proposed in the past is to insert watermark transformed from a spread spectrum signal by using frequency characteristics of an audio signal.

However, the watermarking technique needs original audio data to detect a watermark from audio data. In this occasion, a merit of the watermarking technique is that the watermarking technique can be simply and stably performed. However, demerits of the technique are that it needs a storing place for original audio data, and, further, people who don't have original audio data cannot perform a task to detect a watermark, because only people who have original audio data can extract a watermark. In order to resolve the demerits, even though a watermarking technique to detect a watermark as using blind detection method has been proposed, the technique also has a problem that detection is unstable due to an interfering effect of an original audio signal over a watermark signal whose strength is relatively too small. In order to resolve the problem, a U.S. Pat. No. 5,319,735 uses a watermark-detecting technique as using signals of appropriate strength differently adjusted to each frequency sub-band in an original signal. However, the technique still cannot completely resolve the problem.

Hereinafter, the U.S. Pat. No. 5,319,735 is explained in more detail.

The watermark-inserting/detecting technique uses a method to transfer log2(M) bits using respectively different spread spectrum strings of M, which is similar to M-ary Phase Shift Keying (M-ary PSK). The central idea of the technique is in a method for inserting and detecting a watermark, and the method is based on a modulation and demodulation technique, which is about how to conceal a watermark in an audio signal and how to find the concealed watermark.

In order to make a watermark, a spread spectrum technique is used. A band-limited signal is made by upsampling a spread spectrum signal and passing the upsampled spread spectrum signal through a low-pass filter, and then is moved to a pass band having a range from 2 K to 10 KHz using a carrier signal. Then, strength of an audio signal in each subband is measured through filters. Then, watermark signals are shaped fitted to each subband in proportion to the measured strengths. By such process, the watermark signals can be concealed to the extent of somewhat not being heard.

In the meanwhile, in order to detect the concealed watermark, a blind detection technique is used, which divides a received audio signal to subbands, measures strength of audio signal in each subband through filters, and then, through inverse processes of inserting a watermark, shapes the received audio signal in inverse proportion to the measured strength. By the above mentioned process, even though whitening effect is indirectly occurred and thereby interfering effect between an original signal and an watermark signal is somewhat lessened, the interfering effect in a detecting process is still large enough to make the detecting process unstable so that it still remains a problem.

SUMMARY OF THE INVENTION

Therefore, it is an object of the present invention to provide a method for inserting/detecting a non-audible and error-tolerable watermark to/from an original signal based on an autocorrelation matrix, an eigenvalue analysis and a watermark shaper, thereby reducing an interference between the original signal and the watermark signal, which occurs when a blind detection technique applying a whitening filter to watermark detection is used.

It is another object to provide a computer readable storing medium having a program to accomplish the same method.

In accordance with an aspect of the present invention, there is provided an apparatus for inserting a watermark based on a stochastic model, the apparatus including: a generator for generating a spread spectrum signal to occur a spread spectrum signal by a user key from outside; an estimator for estimating autocorrelation to estimate an autocorrelation matrix of an original signal from outside as an object for inserting a watermark; an eigenvalue decomposer for decomposing to decompose an autocorrelation matrix from the estimator for estimating autocorrelation to both an eigenvector matrix and an eigenvalue matrix; a watermark shaper for shaping a watermark to make a watermark from a spread spectrum signal in reference to both the eigenvector matrix and the eigenvalue matrix; and an adder for adding a watermark to the original signal.

In accordance with another aspect of the present invention, there is provided an apparatus for detecting a watermark based on a stochastic model, the apparatus comprising: a generator for generating a spread spectrum signal to occur a spread spectrum signal by a user key inputted from outside; an estimator for estimating an autocorrelation matrix of an original signal from a watermark-inserted signal received; an eigenvlaue decomposer for decomposing to decompose an autocorrelation matrix from the estimator for estimating autocorrelation to both an eigenvector matrix and an eigenvalue matrix; a watermark shaper for shaping a watermark to make a watermark from a spread spectrum signal in reference to both the eigenvector matrix and the eigenvalue matrix; in order to detect a watermark without using an original audio signal, a filter for filtering for whitening to filter for whitening the watermark-inserted signal by using both the eigenvector matrix and the eigenvalue matrix from the eigenvalue decomposer of decomposing; a correlation measuring unit for measuring correlation to find correlation between a watermark signal from the watermark shaper for shaping a watermark and a whitening-filtered signal from the filter for filtering for whitening; and a decision devise for deciding whether there is a watermark to decide, by referring to a correlation value from the correlation measuring unit for measuring correlation, whether or not a received signal includes a watermark.

In accordance with further another aspect of the present invention, there is provided a method for inserting a watermark based on a stochastic model, the method comprising the steps of: a) generating a spread spectrum signal with a user key inputted from outside; b) estimating an autocorrelation matrix of an original signal from outside as an object for inserting a watermark; c) decomposing an autocorrelation matrix to both an eigenvector matrix and an eigenvalue matrix; d) shaping a watermark from the spread spectrum signal produced by the first step in reference to both the eigenvector matrix and the eigenvalue matrix; and e) adding the watermark produced in the step d) to the original signal from outside.

In accordance with still another aspect of the present invention, there is provided a method for detecting a watermark based on a stochastic model, the method comprising the steps of: a) generating a spread spectrum signal with a user key inputted from outside; b) estimating an autocorrelation matrix of an original signal from a watermark-inserted signal received; c) decomposing an autocorrelation matrix estimated at the second step to both an eigenvector matrix and an eigenvalue matrix; d) shaping a watermark from the spread spectrum signal produced in the step a) in reference to both the eigenvector matrix and the eigenvalue matrix; e) in order to detect a watermark without using an original audio signal, filtering for whitening a watermark-inserted signal by using both the eigenvector matrix and the eigenvalue matrix from the step c); f) measuring correlation between a watermark signal from the fourth step and a whitening-filtered signal from the fifth step; and g) deciding, by referring to a correlation value from the sixth step, whether or not a received signal includes a watermark.

In accordance with still another aspect of the present invention, there is provided a computer readable medium storing a program for executing method for inserting a watermark based on a stochastic model, wherein the computer readable medium is in apparatus for inserting a watermark having a processor, the program comprising the functions of: a) generating a spread spectrum signal from a user key inputted from outside; b) estimating an autocorrelation matrix of an original signal from outside as an object for inserting a watermark; c) decomposing an autocorrelation matrix estimated at the second function to both an eigenvector matrix and an eigenvalue matrix; d) shaping a watermark from a spread spectrum signal in reference to both the eigenvector matrix and the eigenvalue matrix; and e) adding the watermark to the original signal from outside.

In accordance with still another aspect of the present invention, there is provided a computer readable medium storing a program for executing method for detecting a watermark based on a stochastic model, wherein the computer readable medium is in apparatus for detecting a watermark having a processor, the program comprising the functions of: a) generating a spread spectrum signal with a user key inputted from outside; b) estimating an autocorrelation matrix of an original signal from a watermark-inserted signal received from outside as an object for detecting a watermark; c) decomposing an autocorrelation matrix estimated at the second function to both an eigenvector matrix and an eigenvalue matrix; d) shaping a watermark from a spread spectrum signal in reference to both the eigenvector matrix and the eigenvalue matrix; e) in order to detect a watermark without using an original audio signal, filtering for whitening a watermark-inserted signal by using both the eigenvector matrix and the eigenvalue matrix from the function c); f) measuring correlation between a watermark signal from the fourth function and a whitening-filtered signal from the function e); and g) determining whether or not a received signal includes a watermark by referring to a correlation value from the function f).

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Hereinafter, the present invention will be described with reference to the accompanying drawings in detail.

The present invention uses a spread spectrum watermark technique that makes a watermark from a spread spectrum signal by using a user key and embeds the watermark into a digital audio signal in a time domain. In addition, the present invention proposes a watermark algorithm in a stochastic domain. Further, the present invention can minimize interference which can be occurred at blind detection, between an original signal and a watermark signal, so that the detection of a watermark can be best performed.

In the circumstance that digitalized multimedia products are easily distributed in the Internet, due to a characteristic of a digitalized multimedia product as easy duplication, distribution of illegally copied multimedia products can give a serious damage to copyright owners' interest. In nowadays' situation that worry of copyright owners about copyright infringements is widely spread, the present invention helps copyright owners to protect their copyrights as effectively providing a way to find the purchaser of an original product from a copied product.

In order to resolve above mentioned problems, the present invention uses the ways that haven't been used in the past. The present invention determines an autocorrelation matrix based on a stochastic model, and then, through eigenvalue analysis of the autocorrelation matrix, transforms a spread spectrum signal to a non-audible and error-tolerable watermark, and then inserts the watermark into an original signal. Further, the invention makes a storing space saved because it uses a blind detection technique that does not need an original signal, so it makes watermark detection possible under opening to the public. Further, in order to minimize an interference effect that can be a problem at blind detection, the present invention uses a whitening filter using an eigenvalue analysis.

The above mentioned objects, characteristics and merits of the present invention would be more obvious through the following explanations in detail. In the following, desirable examples of the present invention is explained, referring attached figures.

Figure 1:
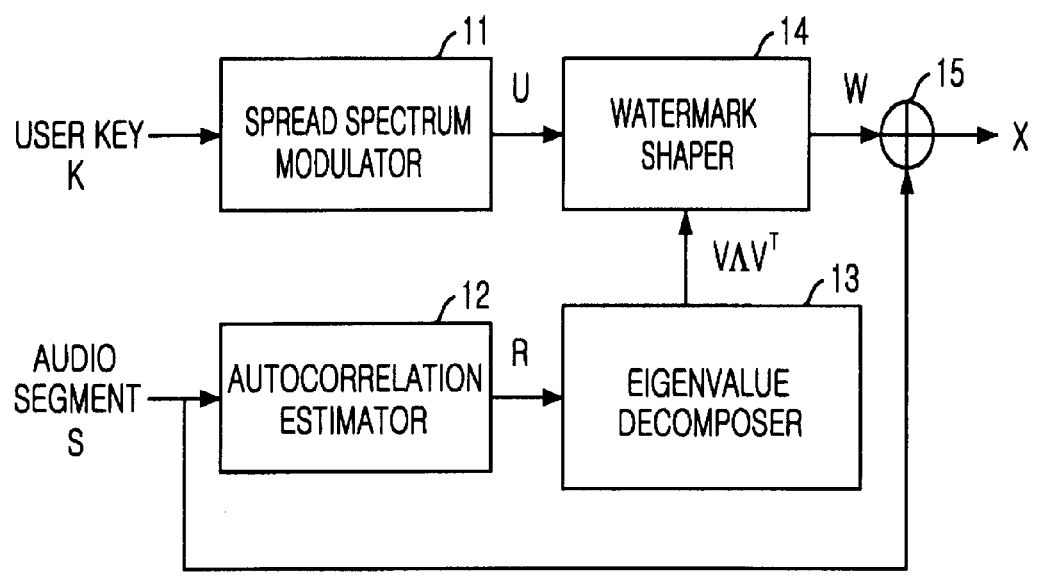
FIG. 1 is a block diagram showing an example of an apparatus for inserting a watermark based on a stochastic model.

FIG. 1 is a block diagram showing an example of an apparatus for inserting a watermark based on a stochastic model. The apparatus for inserting a watermark in the present invention based on a stochastic model includes of a spread spectrum modulator 11 to produce a spread spectrum signal by a user key inputted from outside; an autocorrelation estimator 12 to estimate an autocorrelation matrix of an original signal from outside as an object for inserting a watermark; an eigenvalue decomposer 13 to decompose an autocorrelation matrix from the autocorrelation estimator 12 to both an eigenvector matrix and an eigenvalue matrix; an watermark shaper 14 to make a watermark from a spread spectrum signal from the spread spectrum modulator 11 in reference to both the eigenvector matrix and the eigenvalue matrix from the eigenvalue decomposer 13; and an adder 15 to embed a watermark produced by the watermark shaper 14 into an original signal from outside. At this point, the watermark shaper 14 uses a watermark transformation coefficient, an eigenvector matrix and an eigenvalue matrix in the process that transforms a spread spectrum signal to a watermark signal, and the watermark shaper also controls the power of watermark signal by using a scaling coefficient.

Hereinafter, an example of the apparatus for inserting a watermark is explained in detail referring FIG. 1.

First, the function of the spread spectrum modulator 11 is to receive a user key K that contains a copyright owner's information, and then to output a spread spectrum signal by using the key. A spread spectrum signal inserted in an original signal cannot be tracked without knowing a user key. However, on the occasion of knowing the user key, it is possible to track and regenerate a spread spectrum signal inserted in an original signal. A spread spectrum signal is spread in frequency domain through whole range of frequency used, and in time domain there is no correlation between two parts sampled from a spread spectrum signal. However, when such a spread spectrum signal is inserted in a digital audio signal S, the spread spectrum signal becomes a white noise and makes listeners offensive. In order to resolve such a problem, a watermark shaper 14 is used.

Second, the function of the autocorrelation estimator 12 is to receive an audio signal S, and then output an autocorrelation matrix R. In order to make the autocorrelation matrix, autocorrelation coefficients have to be determined in advance. The autocorrelation coefficients are determined, using Ergodic theorem in time domain, by averaging the product of two values sampled from an audio signal. Then, a Toepliz matrix is made by using the autocorrelation coefficients for off-diagonal elements of the autocorrelation matrix. If an audio signal is S(n), and the size of a watermark, i.e., the order of a watermark matrix, is N, the autocorrelation coefficients are the equation(1) as following.

$$R(k) = \frac{1}{M} \sum_{n=<M>} s(n)s(n-k), M \gg N, k = 0, \ldots, N-1 \quad (1)$$

Then, the Toepliz autocorrelation matrix is the equation (2) as following.

$$R(m,n)=R(|m-n|), m, n=1, \ldots, N \quad (2)$$

Third, the function of the eigenvalue decomposer 13 is to decompose by an eigenvalue analysis an autocorrelation matrix to both an eigenvector matrix V and an eigenvalue matrix, and output both of them. The eigenvalue analysis is the equation (3) as following.

$$Rv_i=\lambda_i v_i, i=0, \ldots, N-1 \quad (3)$$

Here, R is the autocorrelation matrix. $v_i$ and $\lambda_i$ are respectively an eigenvector and an eigenvalue.

Then, the eigenvector matrix is the equation (4) as following.

$$V=[v_0, \ldots, v_{N-1}] \quad (4)$$

Then, the eigenvalue matrix as a diagonal matrix is the equation (5) as following.

$$\Lambda=\mathrm{diag}(\lambda_0, \ldots, \lambda_{N-1}) \quad (5)$$

Then, the eigenvalue decomposition of an autocorrelation matrix is the equation (6) as following.

$$R=V\Lambda V^T \quad (6)$$

Fourth, the function of the watermark shaper 14 is to receive a spread spectrum signal U from the spread spectrum modulator 11, and both an eigenvector matrix V and an eigenvalue matrix from the eigenvalue decomposer 13, and then output a non-audible and error-tolerable watermark signal W. At this point, using a scaling coefficient α, the watermark shaper controls the strength of a watermark signal up to a predefined level in order to lower the strength of the watermark signal up to a relatively small level compared with a audio signal. The scaling coefficient α is showed in the equation (7) as following.

$$\alpha = \sqrt{\frac{N \cdot SNR \cdot \sigma_S^2}{tr(R^{2\beta})}} \quad (7)$$

Here, $\sigma_s^2$ is the power of an audio signal S, and Signal-to-Noise Ratio (SNR) is the power of a watermark divided by the power of an audio signal S.

Then, the watermark shaper 14 controls the transformation degree of a watermark signal that will be transformed from a spread spectrum signal by a transformation coefficient. At this point, the watermark signal W is the equation (8) as following.

$$W=\alpha V \Lambda^\beta V^T U \quad (8)$$

In the above stated equation (8), the watermark shaper 14 also controls by a scaling coefficient the power of an watermark in order to get a desirable SNR, and diagonal elements of the eigenvalue matrix are exponentially multiplied by the transformation coefficient. By using the scaling coefficient, the watermark transformation coefficient, the eigenvector matrix and the eigenvalue matrix, the spread spectrum signal is converted to a watermark signal.

Conclusively, the watermark shaper 14 transforms a spread spectrum signal to a watermark signal by using a transformation coefficient, a scaling coefficient, an eigenvector matrix and an eigenvalue matrix.

Lastly, the function of the adder 15 is to add a watermark signal W produced by the watermark shaper 14 to an original audio signal S, and, finally, output a watermarked audio signal X.

Figure 2:
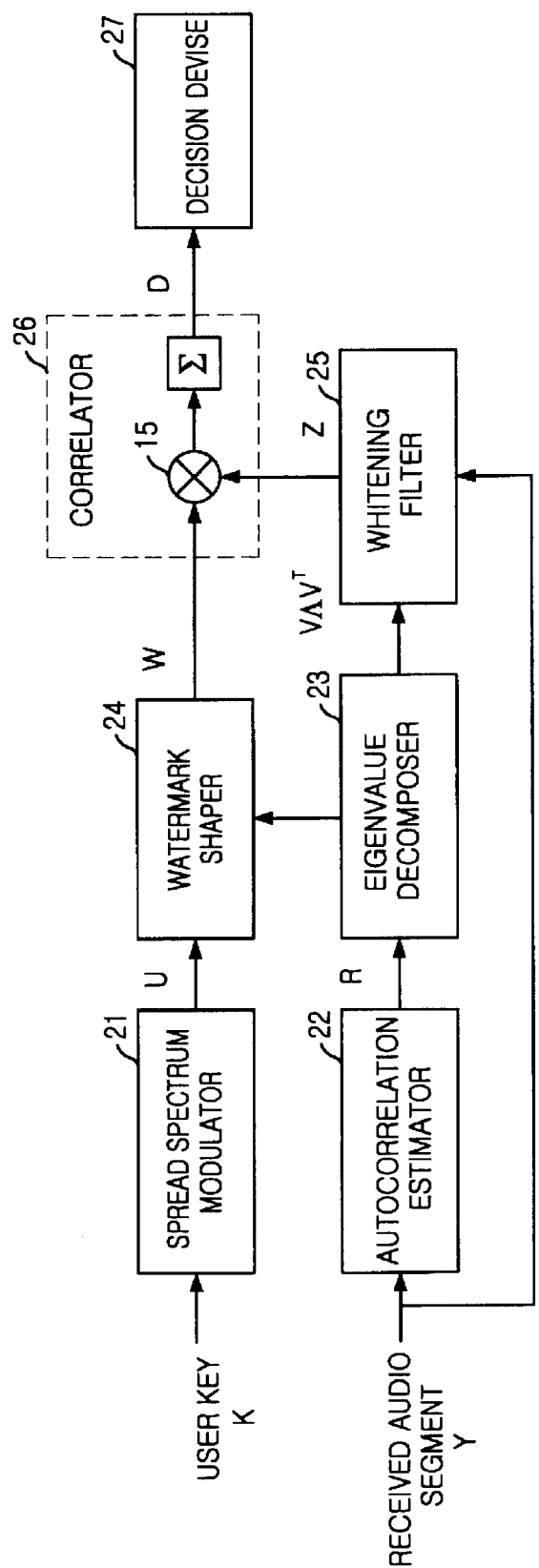
FIG. 2 is a block diagram showing an example of an apparatus for detecting a watermark based on a stochastic model.

FIG. 2 is a block diagram showing an example of an apparatus for detecting a watermark based on a stochastic model. The apparatus for detecting a watermark in the present invention based on a stochastic model includes of a spread spectrum modulator 21 to produce a spread spectrum signal by a user key inputted from outside; an autocorrelation estimator 22 to estimate an autocorrelation matrix of an original signal from a watermark-inserted signal received from outside as an object for detecting a watermark; an eigenvalue decomposer 23 to decompose an autocorrelation matrix, inputted from the autocorrelation estimator 22, to both an eigenvector matrix and an eigenvalue matrix; a watermark shaper 24 to make a watermark from a spread spectrum signal from the spread spectrum modulator 21 in reference to both the eigenvector matrix and the eigenvalue matrix from the eigenvalue decomposer 23; in order to detect a watermark without using an original audio signal, a whitening filter 25 to filter for whitening the watermark-inserted signal by using both an eigenvector matrix and an eigenvalue matrix from the eigenvalue decomposer 23; a correlator 26 to measure correlation between a watermark signal from the watermark shaper 24 and a whitening-filtered signal from the whitening filter 25; a decision device 27 to decide, by referring to a correlation value from the correlator 26, whether or not a received signal has a watermark. At this point, the watermark shaper 24 uses a watermark transformation coefficient, an eigenvector matrix and an eigenvalue matrix in the process that transforms a spread spectrum signal to a watermark signal, and the watermark shaper also controls the power of watermark signal by using a scaling coefficient.

Hereinafter, an example of the apparatus for detecting a watermark is explained in detail referring FIG. 2.

First, the function of the spread spectrum modulator 21 is the same as the function of the spread spectrum modulator 11. Simply, the spread spectrum modulator 21 outputs a spread spectrum signal by using a user key for a specific watermark for which detection is requested.

Second, the function of the autocorrelation estimator 22 is the same as the function of the autocorrelation estimator 12. Only a difference is that the autocorrelation estimator receives a received audio signal instead of an original audio signal, so it performs blind detection. Therefore, even though, when an autocorrelation matrix is determined, there is a small amount of error between a received audio signal and an original audio signal, the error is minute enough to be ignored, because a scaling coefficient $\alpha$ is decided to make the strength of a watermark signal negligibly small.

Third, the functions of an eigenvalue decomposer 23 and a watermark shaper 24 are the same as the functions of an eigenvalue decomposer 13 and a watermark shaper 14 in the FIG. 1.

Fourth, the function of a whitening filter 25 is to determine a whitening filter matrix Q by using an eigenvector matrix V and an eigenvalue matrix received from an eigenvalue decomposer 23, and output a whitening-filtered signal Z obtained by processing a received audio signal. At this point, the whitening filter is a time-variant-non-causal filter, and the whitening filter matrix Q is defined as the equation (9) as following.

$$Q = V(\Lambda + \gamma I)^{-1} V^T \text{ or} \qquad (9)$$

$$Q = V(\max(\Lambda, \gamma I))^{-1} V^T$$

where, this point, $\gamma$ is an error-tolerant coefficient, so it prevents errors that can be occurred by singular value detection. I is the unit matrix of N×N. The max( ,$\gamma$I) is a matrix made by selecting a larger element between two elements located on the same position in the two matrices. An inverse diagonal matrix is obtained by replacing diagonal elements of a matrix with inversed values of the diagonal elements of the matrix. A received signal Y and a whitening-filtered signal Z is in the equation (10) as following.

$$Z = QY \qquad (10)$$

In the above stated equation (10), the whitening filter 25 performs filtering for whitening after calculating an inverse eigenvalue matrix and obtaining a whitening filter matrix by transforming, using a error-tolerant coefficient, diagonal elements of an inverse eigenvalue matrix.

Fifth, the function of the correlator 26 is to output the degree of correlation between a watermark signal W and a whitening-filtered signal Z. the correlation between Z and W is obtained by the equation (11) as following.

$$D = W^T Z \qquad (11)$$

Lastly, the function of the decision device 27 to compare a correlation value inputted from the correlator 26 with a criterion value. Then, if the correlation value exceeds the criterion value, the decision device determines that a watermark W exists, but, if not, it determines that a watermark does not exist.

Figure 3:
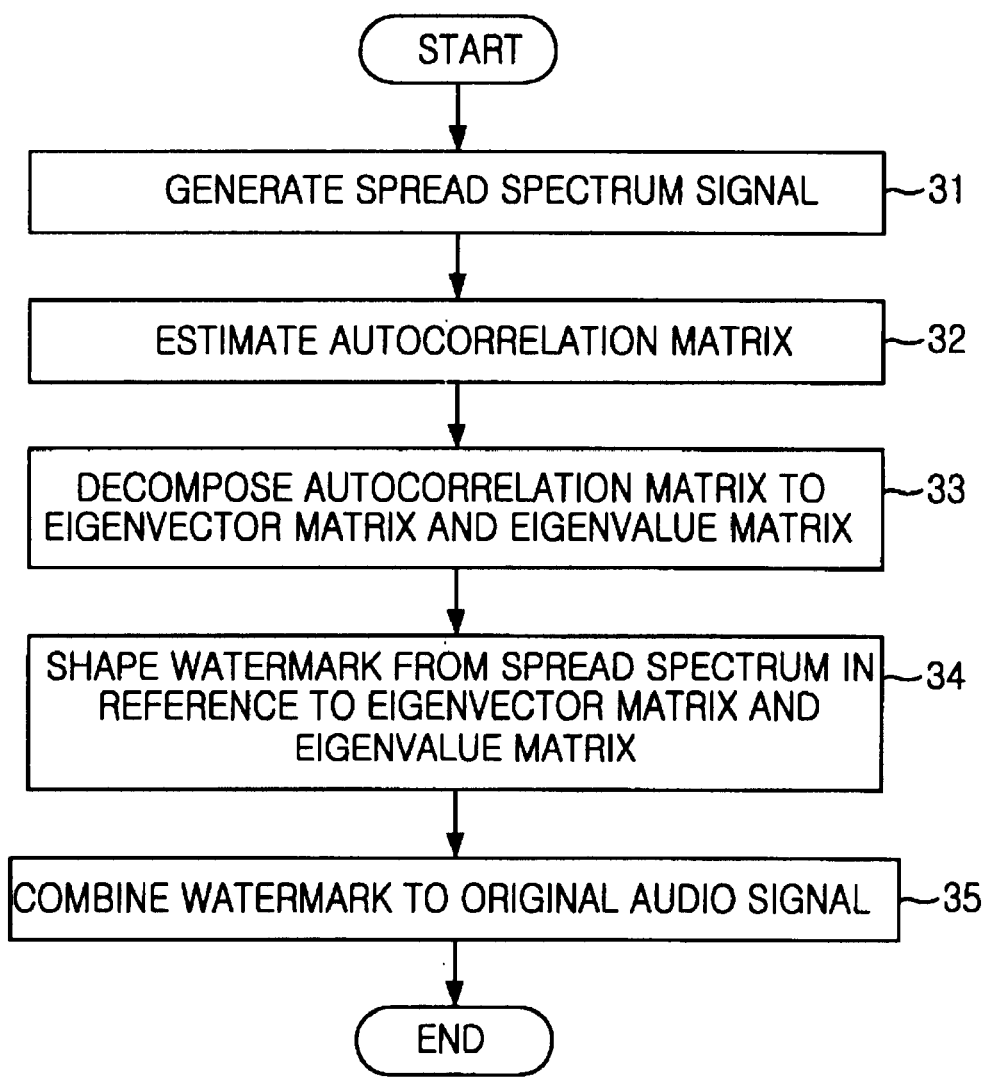
FIG. 3 shows in a flow diagram form a method for inserting a watermark based on a stochastic model.

FIG. 3 is a flow diagram form showing an example of the method for inserting a watermark based on a stochastic model.

First, the spread spectrum modulator 11 produces a spread spectrum signal with a user key from outside at step 31.

Second, the autocorrelation estimator estimates the autocorrelation matrix of an original audio signal from outside as an object for inserting a watermark at step 32.

Third, the eigenvalue decomposer 13 decomposes an autocorrelation matrix from the autocorrelation estimator 12 to both an eigenvector matrix and an eigenvalue matrix at step 33.

Fourth, the watermark shaper 14 makes a watermark from a spread spectrum signal from the spread spectrum modulator 11 in reference to both the eigenvector matrix and the eigenvalue matrix from the eigenvalue decomposer 13 at step 34.

Lastly, the adder 15 embeds a watermark produced by the watermark shaper 14 into an original audio signal from outside at step 35.

At this point, the watermark shaper 14 uses a watermark transformation coefficient, an eigenvector matrix and an eigenvalue matrix in the process that transforms a spread spectrum signal to a watermark signal, and the watermark shaper also controls the power of watermark signal by using a scaling coefficient.

Figure 4:
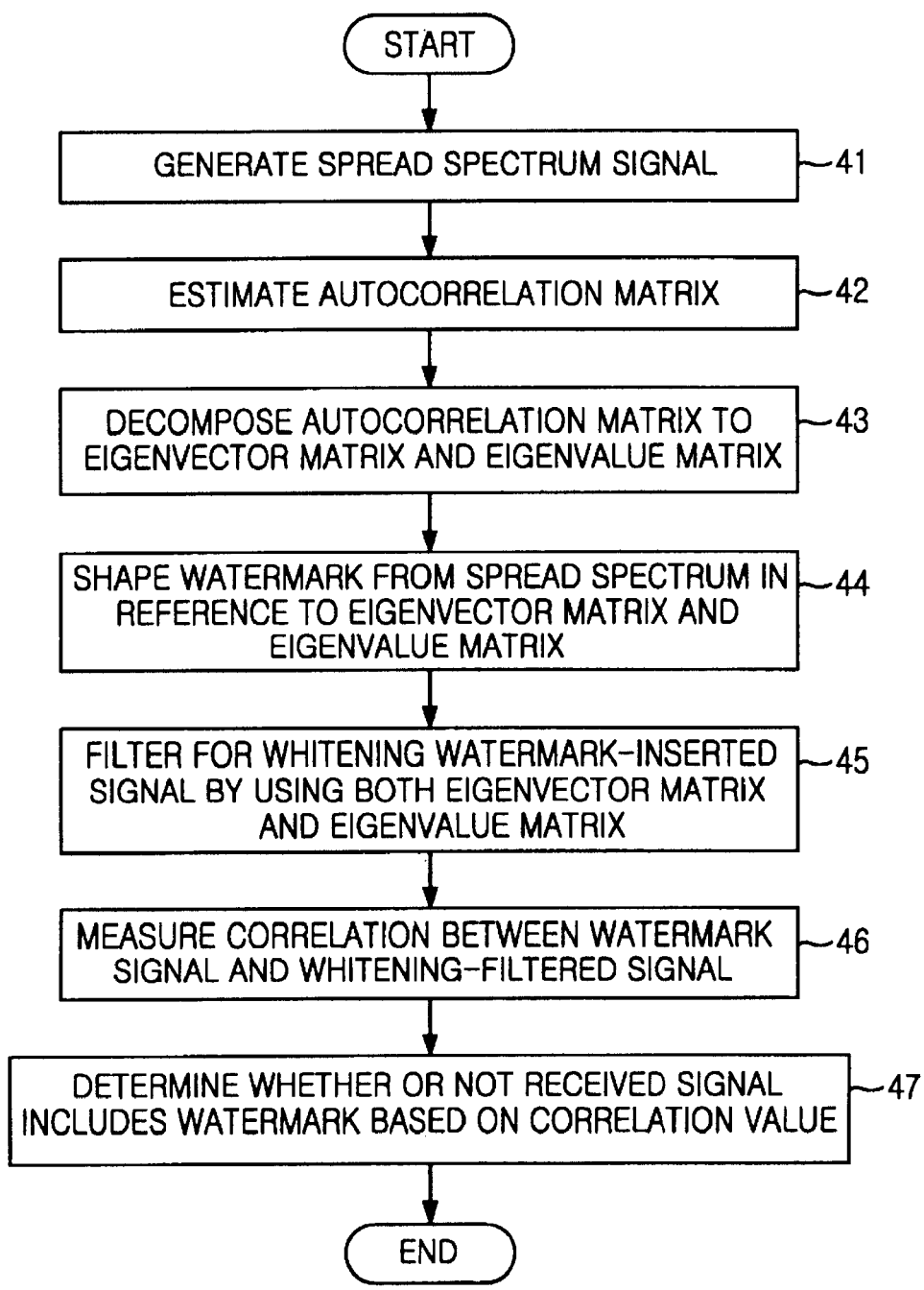
FIG. 4 shows in a flow diagram form a method for detecting a watermark based on a stochastic model.

FIG. 4 is a flow diagram form showing an example of the method for detecting a watermark based on a stochastic model.

First, the spread spectrum modulator 21 produces a spread spectrum signal with a user key from outside at step 41.

Second, the autocorrelation estimator 22 estimates an autocorrelation matrix of an original signal from a watermark-inserted signal received from outside as an object for detecting a watermark at step 42.

Third, the eigenvalue decomposer 23 decomposes an autocorrelation matrix, inputted from the autocorrelation estimator 22, to both an eigenvector matrix and an eigenvalue matrix at step 43.

Fourth, the watermark shaper 24 makes a watermark from a spread spectrum signal from the spread spectrum modulator 21 in reference to both the eigenvector matrix and the eigenvalue matrix from the eigenvalue decomposer 23 at step 44.

Fifth, in order to detect a watermark without using an original audio signal, the whitening filter 25 filters for whitening the watermark-inserted signal by using both an eigenvector matrix and an eigenvalue matrix from the eigenvalue decomposer 23 at step 45.

Sixth, the correlator 26 measures correlation between a watermark signal from the watermark shaper 24 and a whitening-filtered signal from the whitening filter 25 at step 46.

Lastly, the decision device 27 decides, by referring to a correlation value from the correlator 26, whether or not a received signal has a watermark at step 47.

At this point, the watermark shaper 24 uses a watermark transformation coefficient, an eigenvector matrix and an eigenvalue matrix in the process that transforms a spread spectrum signal to a watermark signal, and the watermark shaper also controls the power of watermark signal by using a scaling coefficient.

Although the preferred embodiments of the invention have been disclosed for illustrative purpose, those skilled in the art will be appreciate that various modifications, additions and substitutions are possible, without departing from the scope and spirit of the invention as disclosed in the accompanying claims.

What is claimed is:

1. An apparatus for inserting a watermark based on a stochastic model, said apparatus comprising:

means for generating a spread spectrum signal by using a user key from outside;

means for estimating an autocorrelation matrix of an original signal from outside as an object for inserting a watermark;

means for decomposing the autocorrelation matrix to an eigenvector matrix and an eigenvalue matrix;

means for shaping a watermark from the spread spectrum signal in reference to both the eigenvector matrix and the eigenvalue matrix; and means for adding the watermark to the original signal.

2. The apparatus as recited in claim 1, wherein said means for shaping a watermark uses a watermark transformation coefficient in the process of making a watermark from a spread spectrum signal in reference to both the eigenvector matrix and the eigenvalue matrix.

3. The apparatus as recited in claim 1, wherein said means for shaping a watermark controls the strength of a watermark by using a scaling coefficient.

4. The apparatus as recited in claim 3, wherein said means for shaping a watermark controls by a scaling coefficient the power of an watermark in order to get a desirable SNR, the diagonal elements of the eigenvlaue matrix are exponentially multiplied by the watermark transformation coefficient, and a spread spectrum signal is transformed to a watermark signal by using a transformation coefficient, a scaling coefficient, an eigenvector matrix and an eigenvalue matrix.

5. The apparatus as recited in claim 3, wherein said means for estimating an autocorrelation determines in a time domain autocorrelation coefficients by using Ergodic theorem, and then a Toepliz autocorrelation matrix by using the autocorrelation coefficients.

6. An apparatus for detecting a watermark based on a stochastic model, said apparatus comprising:

means for generating a spread spectrum signal by using a user key inputted from outside;

means for estimating an autocorrelation matrix of an original signal from a watermark-inserted signal received;

means for decomposing the autocorrelation matrix to an eigenvector matrix and an eigenvalue matrix;

means for shaping a watermark from a spread spectrum signal in reference to the eigenvector matrix and the eigenvalue matrix;

in order to detect a watermark without using an original audio signal, means for filtering for whitening the watermark-inserted signal by using both the eigenvector matrix and the eigenvalue matrix from the means of decomposing;

means for measuring correlation to find correlation between a watermark signal from said means for shaping a watermark and a whitening-filtered signal from said means for filtering for whitening; and means for determining whether there is a watermark by referring to a correlation value from said means for measuring correlation, whether or not a received signal includes a watermark.

7. The apparatus as set forth in claim 6, wherein said means of shaping a watermark uses a watermark transformation coefficient in the process of making a watermark from a spread spectrum signal in reference to both the eigenvector matrix the eigenvalue matrix.

8. The apparatus as recited in claim 6, wherein said means for shaping a watermark controls the strength of a watermark by using a scaling coefficient.

9. The apparatus as recited claim 8, wherein said means for filtering for whitening performs filtering for whitening after calculating an inverse eigenvalue matrix and obtaining a whitening filter matrix by using a transforming coefficient, an error-tolerant coefficient, and diagonal elements of an inverse eigenvalue matrix.

10. A method for inserting a watermark based on a stochastic model, said method comprising the steps of:

a) generating a spread spectrum signal by using a user key inputted from outside;

b) estimating an autocorrelation matrix of an original signal from outside as an object for inserting a watermark;

c) decomposing an autocorrelation matrix to an eigenvector matrix and an eigenvalue matrix;

d) shaping a watermark from the spread spectrum signal produced in the step a) in reference to both the eigenvector matrix and the eigenvalue matrix; and e) adding a watermark produced by said step d) to the original signal from outside.

11. The method as recited in claim 10, wherein said step d) uses a watermark transformation coefficient in the process of making a watermark from a spread spectrum signal in reference to both the eigenvector matrix and the eigenvalue matrix.

12. The method as recited in either claim 10, wherein said step d) controls the strength of a watermark by using a scaling coefficient.

13. The method as recited in claim 12, wherein said step d) controls by a scaling coefficient the power of an watermark in order to get a desirable SNR, the diagonal elements of the eigenvlaue matrix are exponentially multiplied by the watermark transformation coefficient, the spread spectrum signal is transformed to a watermark signal by using a transformation coefficient, a scaling coefficient, an eigenvector matrix and an eigenvalue matrix.

14. The method as recited in claim 10, wherein said step b) includes the steps of:

b1) determining in a time domain autocorrelation coefficients by using Ergodic theorem; and b2) the seventh step to determine a Toepliz autocorrelation matrix by using the autocorrelation coefficients.

15. A method for detecting a watermark based on a stochastic model, said method comprising the steps of:
   a) generating a spread spectrum signal by using a user key inputted from outside;
   b) estimating an autocorrelation matrix of an original signal from a watermark-inserted signal received;
   c) decomposing an autocorrelation matrix estimated at said step b) to both an eigenvector matrix and an eigenvalue matrix;
   d) shaping a watermark from the spread spectrum signal produced in said step a) in reference to both the eigenvector matrix and the eigenvalue matrix;
   e) in order to detect a watermark without using an original audio signal, filtering for whitening a watermark-inserted signal by using both the eigenvector matrix and the eigenvalue matrix from said step c);
   f) measuring correlation between a watermark signal from said step d) and a whitening-filtered signal from said step e); and
   g) determining, by referring to a correlation value from said step f), whether or not a received signal includes a watermark.

16. The method as recited in claim 15, wherein said step d) to shape a watermark uses a watermark transformation coefficient in the process of making a watermark from a spread spectrum signal in reference to both the eigenvector matrix and the eigenvalue matrix.

17. The method as recited in claim 15, wherein said step d) controls the strength of a watermark by using a scaling coefficient.

18. The method as recited in claim 17, wherein said step e) performs filtering for whitening after calculating an inverse eigenvalue matrix and obtaining a whitening filter matrix by using a transforming coefficient, an error-tolerant coefficient, and diagonal elements of an inverse eigenvalue matrix.

19. A computer readable medium storing a program for executing method for inserting a watermark based on a stochastic model, wherein the computer readable medium is in apparatus for inserting a watermark having a processor, the program comprising the functions of:
   a) generating a spread spectrum signal by using a user key inputted from outside;
   b) estimating an autocorrelation matrix of an original signal from outside as an object for inserting a watermark;
   c) decomposing an autocorrelation matrix estimated at the function b) to an eigenvector matrix and an eigenvalue matrix;
   d) shaping a watermark from a spread spectrum signal in reference to both the eigenvector matrix and the eigenvalue matrix; and
   e) adding the watermark to the original signal from outside.

20. A computer readable medium storing a program for executing method for detecting a watermark based on a stochastic model, wherein the computer readable medium is in apparatus for detecting a watermark having a processor, the program comprising the functions of:
   a) generating a spread spectrum signal by using a user key inputted from outside;
   b) estimating an autocorrelation matrix of an original signal from a watermark-inserted signal received from outside as an object for detecting a watermark;
   c) decomposing an autocorrelation matrix estimated at said second function to an eigenvector matrix and an eigenvalue matrix;
   d) shaping a watermark from a spread spectrum signal in reference to both the eigenvector matrix and the eigenvalue matrix;
   e) in order to detect a watermark without using an original audio signal, filtering for whitening a watermark-inserted signal by using both the eigenvector matrix and the eigenvalue matrix from the function c);
   f) measuring correlation between a watermark signal from the function d) and a whitening-filtered signal from the function e); and
   g) determining whether or not a received signal includes a watermark by referring to a correlation value from the function f).

* * * * *